W. HADDOCK.
Machine for Cutting Nails.
No. 6,435.
Reissued May 18, 1875.
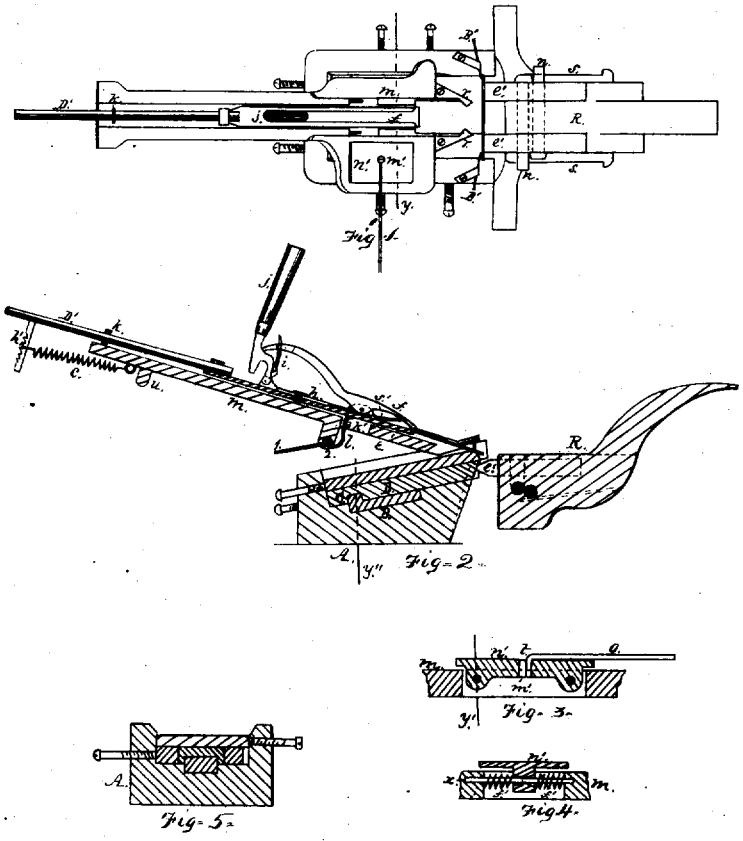
WITNESSES-
Henry Gerding
Thomas Jones
INVENTOR-
Worcester Haddock
THE GRAPHIC CO. PHOTO-LITH. 39 & 41 PARK PLACE, N.Y.

UNITED STATES PATENT OFFICE.

WORCESTER HADDOCK, OF PITTSBURG, PA., ASSIGNOR, BY MESNE ASSIGNMENTS, TO THE HADDOCK NAIL-MACHINE AND NAIL COMPANY.

IMPROVEMENT IN MACHINES FOR CUTTING NAILS.

Specification forming part of Letters Patent No. 144,845, dated November 25, 1873; reissue No. 6,435, dated May 18, 1875; application filed May 11, 1875.

*To all whom it may concern:*

Be it known that I, WORCESTER HADDOCK, of Pittsburg, in the county of Allegheny and State of Pennsylvania, have invented a new and useful Improvement in Self-Feeding Nail-Machines; and I do hereby declare that the following is a full, clear, and exact description thereof, reference being had to the accompanying drawings and to the letters of reference marked thereon.

The object of my invention is to feed the plate from which the nails are cut without the necessity of reversing it, as in the ordinary nail-machine.

The nature of my invention consists in the combination of devices hereinafter described for automatically feeding the plate from which the nails are cut to the vibrating cutter, and giving to the nail the desired taper and sufficient metal to form the head upon it. My invention also consists in an improvement in the die-box and in the means used for holding the griping-dies in the vibrating head of the machine.

To enable others skilled in the art with which it is most nearly connected to make and use my invention, I will proceed to describe its construction and operation.

In the accompanying drawings, which form part of my specification, Figure 1 is a top view of my improvement in self-feeding nail-machines. Fig. 2 is a vertical section of the same. Fig. 3 is a section of the vibrator at line *y*. Fig. 4 is a section of the same at line *y'*. Fig. 5 is a transverse section of the die-box at line *y''*.

The improvement hereinafter described is particularly adapted to that class of self-feeding nail-cutting machines which have two headers. (A description of such machine may be found in Letters Patent granted to Daniel Reed, and bearing date December 29, 1868.)

In my improvement in self-feeding nail-machines the die-box A is of the ordinary construction, excepting a recess made in the bottom of it, in which is placed what I term an adjustable stop, B, having a projection, C, which is fitted into a recess made in the under side of the bed-piece D. By this arrangement of the stop B and bed-piece D the griping dies *e'* and bed-piece in the die-box will be held in a firm and fixed position and will not be liable to move forward by the jarring action of the headers. The bed-piece D may be moved forward when it is necessary to move them by cutting away a portion of the inner end of the stop B. The die-box A is provided with guards B', which are used for the purpose of determining the lateral movement of the plate from which the nails are cut. The nipper for holding and feeding forward the nail-plate consists of an under jaw, *e*, to which is pivoted an upper jaw, *f*, and of an adjustable slide, *h*, to which is pivoted a lever, *j*, which is connected to the upper jaw *f* by a link, *i*, so that by moving the lever *j* toward the cutters it will cause the upper jaw *f* to close down on the plate placed between it and the lower jaw *e*. The grasp of jaws *f* and *e* is released by drawing back the lever *j*, and by the upward pressure of the spring *s'* against the upper jaw *f*. The relation of the lever *j* and link *i* to the upper jaw *f* can be changed through the medium of the slide *h* by moving it back or forward on the under jaw *e*. The handle D' of the nipper when arranged on the vibrator is placed in a guide, *k*, as shown in Figs. 1 and 2. On the outer end of the handle D' of the plate-nipper is a notched pendant, *h'*, to which is attached a spring, *c*, which forces the nipper and the plate in it along on the vibrator to the cutters of the machine. The vibrator *m* is furnished with a pivot-point, *u*, which is placed in a slide on the front end of the machine, which slide moves on a line at right angle to the longitudinal plane of the vibrator *m*, the front end of which rests on the die-box A.

The back end (pivoted end) of the vibrator in every case travels a greater distance than the inner end of it. The object of this difference in the travel of the two ends of the vibrator *m* is for securing the desired taper to the nails, which taper will depend on the distance traveled by the pivoted end of the vibrator. The vibrator *m* is furnished with holders *r* for holding the nail-plate down on the under cutter of the machine. The vibrator is also provided with an opening, *k'*, and a pivoted forked hook, *l*, the prongs of which project a little above the bottom of the groove in the vibrator, in which groove the nipper and plate travel. The points of the prongs of the hook *l* are curved toward the cutters of the machine, as shown in Fig. 2, so that the plate will pass over them, and the nipper between them. When the nipper has performed its office of feeding the plate to the cutters, in drawing it back to receive another plate, the scrap remaining between the jaws of the nipper will catch against the projecting prongs of the hook *l*, which, in connection with the backward movement of the nipper, will withdraw the scrap from between its jaws, which will drop down through the opening *k'*, and pass from the machine. On one side of the vibrator *m* is an attachment-plate, *n'*, which is held in position by means of rods *x*, which pass through lugs on the under side of it, and by the spiral springs *f'* on the rods, and on each side of the lugs. By this arrangement of the plate it and the vibrator will adjust their action to each other and to the action of the driving-gear, so that any undue movement of the vibrator will be compensated for—that is to say, the nail-plate will stop against the ends of the guards B', while the vibrator is moving beyond the point of its proper travel. The vibrator is connected to the driving-gear of the machine through the medium of the rod *o*, having hook *t*, which is placed in the opening *m'* of the plate *n'*. By this arrangement the vibrator can be connected and disconneced from the driving-gear with great ease and facility.

The next and last feature of my improvement consists in securing the griping-dies in the vibrating head of the machine through the medium of two hooks in contradistinction to set-screws ordinarily used for that purpose. These hooks *n*, which hold the griping-dies *e'* in the vibrating head R, are made to impinge upon the griping-dies through the medium of keys *s*, which are driven into the hooks through openings in them, so arranged that the heads of the keys are most distant from the axis of the vibrating head R, and in the most convenient position for being driven into the hooks *n*.

The advantage of using hooks in place of set-screws can only be appreciated by operators of nail-cutting machines.

The form of the hooks *n* are L-shaped, the short limb of the letter catching on the side of the griping-dies *e'*.

It will be observed that the forked hook *l* is pivoted at the point marked 2, and that part of the hook marked 1 will, by its greater weight, throw up the prongs 3, when the nail-plate passes beyond them in being fed to the machine, so that the prongs will catch against the scrap in the nipper, as and for the purpose hereinbefore described.

Having thus described the nature, construction, and operation of my improvement, what I claim as of my invention, and desire to secure by Letters Patent, is—

1. The die-box A, having a recess for the reception of a stop, B, provided with a projection, C, fitted to a recess in the bed-piece D, substantially as herein described, and for the purpose set forth.

2. The plate-nipper consisting of the jaw *e*, and pivoted jaw *f*, in combination with the locking device consisting of the adjustable slide *h*, link *i*, and pivoted lever *j*, said parts constructed, arranged, and operating with relation to each other, substantially as herein described, and for the purpose set forth.

3. In combination with the vibrator *m*, having opening *k* and the tongs for griping the plate, the forked lever *l*, substantially as described, and for the purpose set forth.

4. The connecting-rod *o*, furnished with a hook, *t*, in combination with the plate *n'*, having openings *m'*, and held in position with relation to vibrator *m*, through the medium of rods *x*, and springs *f*, substantially as herein described, and for the purpose set forth.

5. In combination with the vibrating griping-head R of a nail-cutting machine, the hooks *n*, and keys *s*, arranged and operating substantially as herein described, and for the purpose set forth.

WORCESTER HADDOCK.

Witnesses:
HENRY GERDING,
THOMAS JONES.